United States Patent [19]

Bosio et al.

[11] 4,026,617
[45] May 31, 1977

[54] APPARATUS FOR STORING AND DISPLAYING ARTICLES

[76] Inventors: Jean-Francois Bosio, 56, Avenue Massenet, 93150 Le Blanc-Mesnil, France; Charles Spindler, 124, Blvd. Magenta, 75010 Paris, France

[22] Filed: June 16, 1975

[21] Appl. No.: 586,951

Related U.S. Application Data

[63] Continuation-in-part of Ser. No. 466,633, May 3, 1974, abandoned.

[30] Foreign Application Priority Data

Dec. 12, 1973 France .............................. 73.44688

[52] U.S. Cl. .................................. 312/268; 312/91; 198/701
[51] Int. Cl.² ...................... A47F 5/00; B65G 17/00
[58] Field of Search ............. 312/268, 91; 198/148, 198/158

[56] References Cited

UNITED STATES PATENTS

| 142,003 | 8/1873 | Crumbie | 198/158 |
| 679,894 | 8/1901 | Hunt | 198/148 |
| 686,828 | 11/1901 | Myers | 312/268 |
| 756,510 | 4/1904 | Grand | 198/148 |
| 1,539,808 | 5/1925 | Allsop | 198/158 |
| 1,542,817 | 6/1925 | Bernheim | 312/268 |
| 2,747,723 | 5/1956 | Hapman | 198/148 |
| 3,042,472 | 7/1962 | Ibel | 312/268 |
| 3,199,658 | 8/1965 | Graber et al. | 312/268 |
| 3,851,764 | 12/1974 | Anders | 312/268 |
| 3,874,496 | 4/1975 | Bodin | 198/158 |

FOREIGN PATENTS OR APPLICATIONS

| 1,341,619 | 9/1963 | France | 312/268 |
| 571,928 | 9/1945 | United Kingdom | 198/158 |

*Primary Examiner*—Paul R. Gilliam
*Assistant Examiner*—Victor N. Sakran
*Attorney, Agent, or Firm*—Kurt Kelman

[57] ABSTRACT

Apparatus for storing and displaying articles for sale on transverse article supporting members pivotally fastened to a pair of endless movable chains mounted on two uprights so that they swing freely on the moving chains. Each chain has an upwardly and a downwardly moving course and the ends of the transverse swinging members are fastened to the same course of each chain for movement therewith. The articles are supported on the transverse swinging members, the capacity and congestion being variable by changing the number of traverse members. An electric motor may be the power source for driving the chains and a control button may operate the motor for moving the chains selectively up or down, and for stopping them.

1 Claim, 5 Drawing Figures

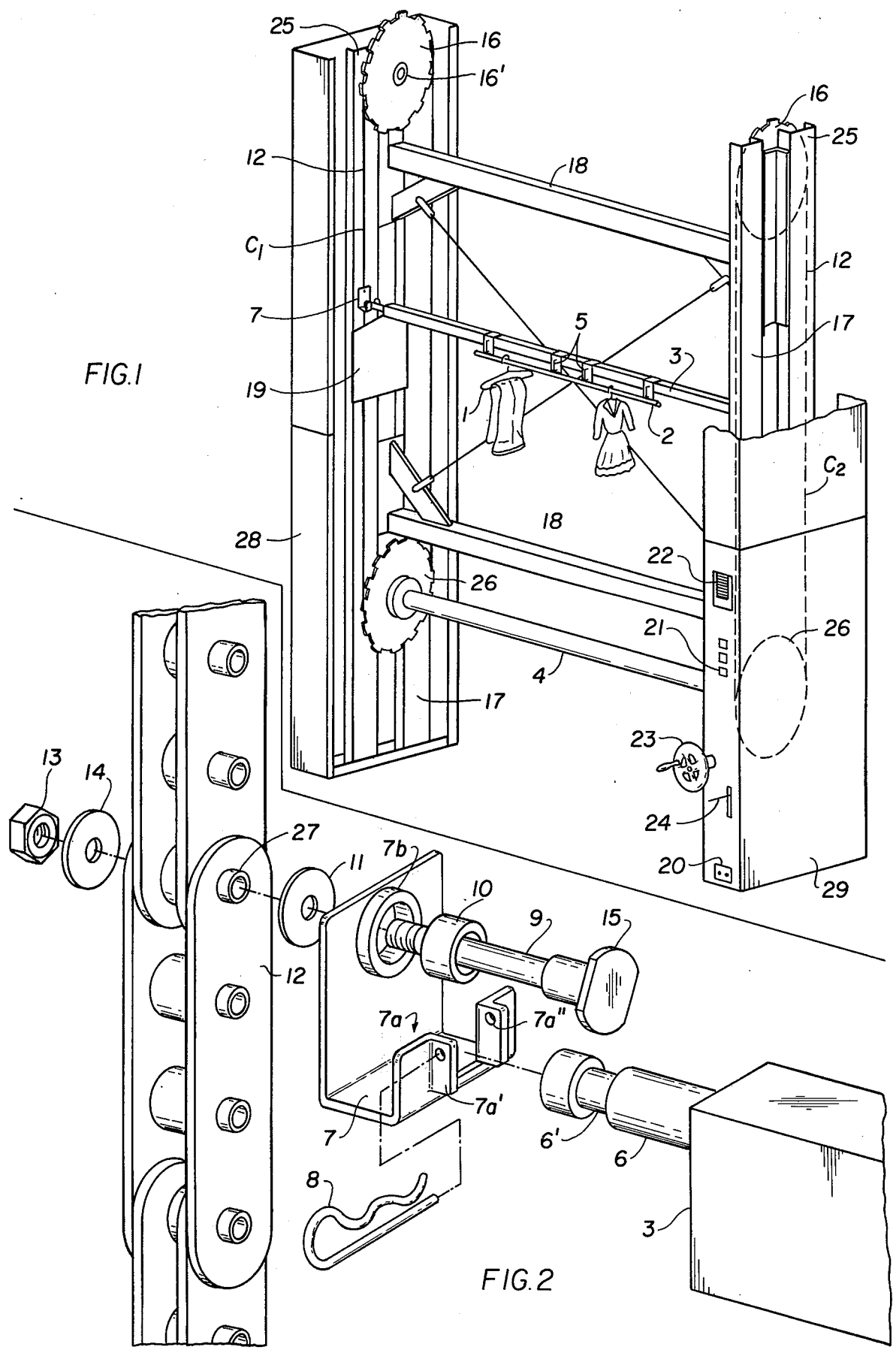

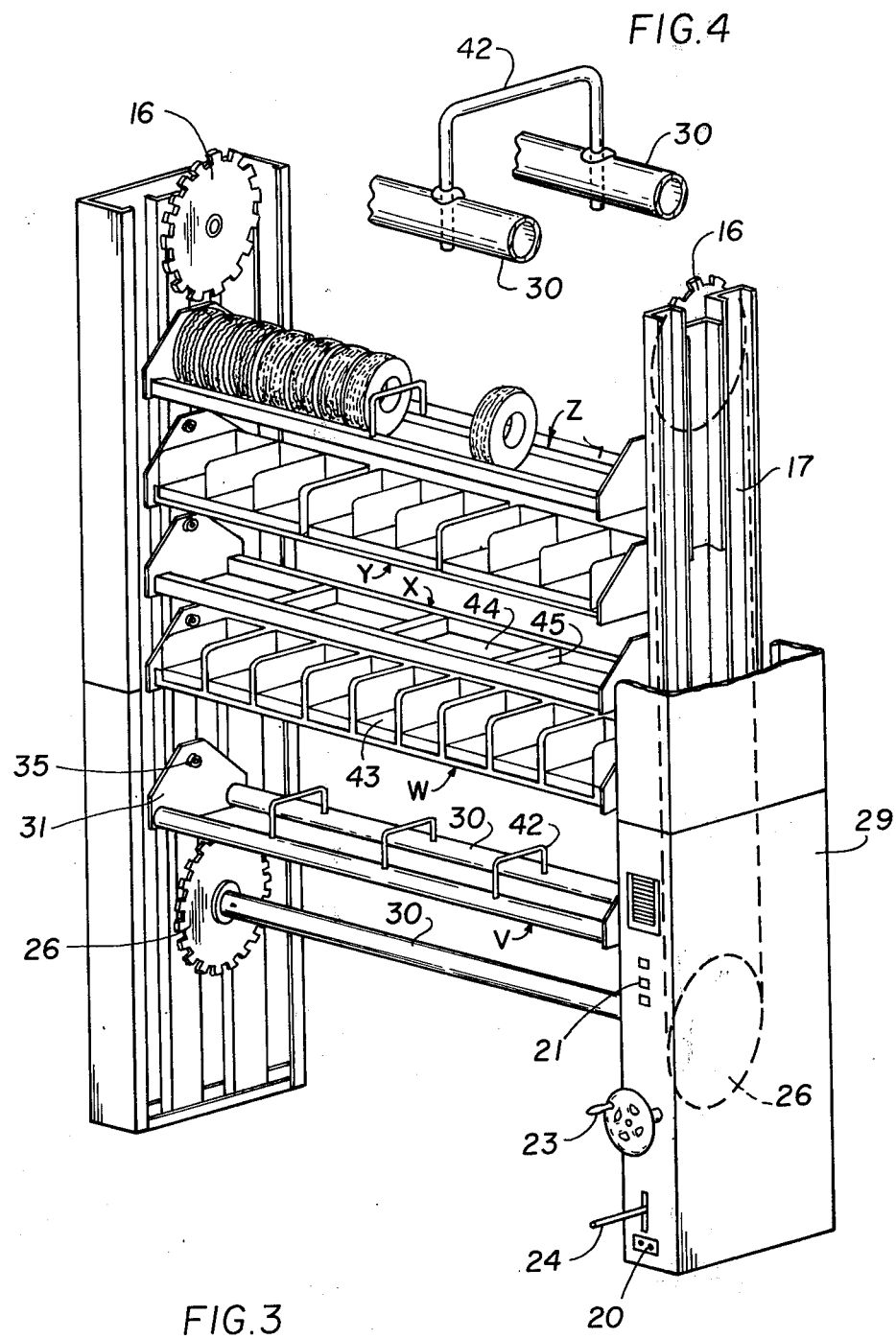

APPARATUS FOR STORING AND DISPLAYING ARTICLES

This is a continuation-in-part of our copending application Ser. No. 466,633, filed May 3, 1974, now abandoned.

The present invention relates to a vertically movable article storing and display support.

When articles are stored and displayed for sale on fixed racks, the customer must move from rack to rack to make his selection.

It is the primary object of this invention to enable a customer to remain in place and simply to press a button to have a movable display of articles pass before his eyes. The same apparatus also greatly facilitates the storage of the articles, enabling the number of articles being stored and displayed on the same floor space to be considerably increased.

The size of the article storing and displaying apparatus of the invention is determined by the size of the articles, and if the articles are garments, for instance, the number of support rods for the garments and the number of movable transverse supporting members on which these support rods are mounted.

The apparatus is useful for a great variety of articles to be stored and/or displayed for sale. In addition to garments hung on support rods carried by the transverse pivotal members, these members may carry open or sub-divided shelves to store and display all sorts of articles, such as cosmetics, pharmaceuticals, luggage and briefcases, books, underwear, shoes, bottles, tires, wheels, and any other type of article.

The above and other objects and advantages are accomplished in accordance with the present invention with a pair of uprights, a pair of endless movable chains mounted on the uprights, each chain having an upwardly and a downwardly moving course, and a transverse article supporting swinging member having two ends. A respective one of the ends of the swinging member is fastened pivotally on a respective one of the chains, the ends being fastened to the same course of each chain for movement therewith, and the articles are supported on the transverse swinging member.

In the preferred and illustrated embodiments of this invention, the swinging member ends are so fastened to the chains that they pivot freely about an axis perpendicular to the planes on which the two chains move to horizontal position when the upwardly moving chain courses change into the downwardly moving courses during the movement of the chains about pairs of sprockets over which the chains are trained.

Also, the two uprights may be interconnected by bracing means and the two upper sprockets of the two endless chain drives preferably define a free space therebetween to permit the articles supported on the transverse pivotal member to pass through the space when the courses are reversed from their upward to their downward movement.

According to yet another preferred feature, an axle interconnects two transversely aligned lower sprockets of the two endless chain drives and the interconnected sprockets are power-driven in unison, preferably by an electric motor.

The above and other objects, advantages and features of the invention will become more apparent from the following detailed description of now preferred embodiments of the apparatus, taken in conjunction with the accompanying drawing wherein FIG. 1 is a schematic perspective view of one embodiment of the apparatus;

FIG. 2 is an exploded perspective view of one embodiment of means for fastening a transverse member end to the adjacent course of a chain;

FIG. 3 is a view similar to that of FIG. 1, showing another embodiment of the apparatus;

FIG. 4 is a perspective view of a detail of FIG. 3; and

Figure 5:
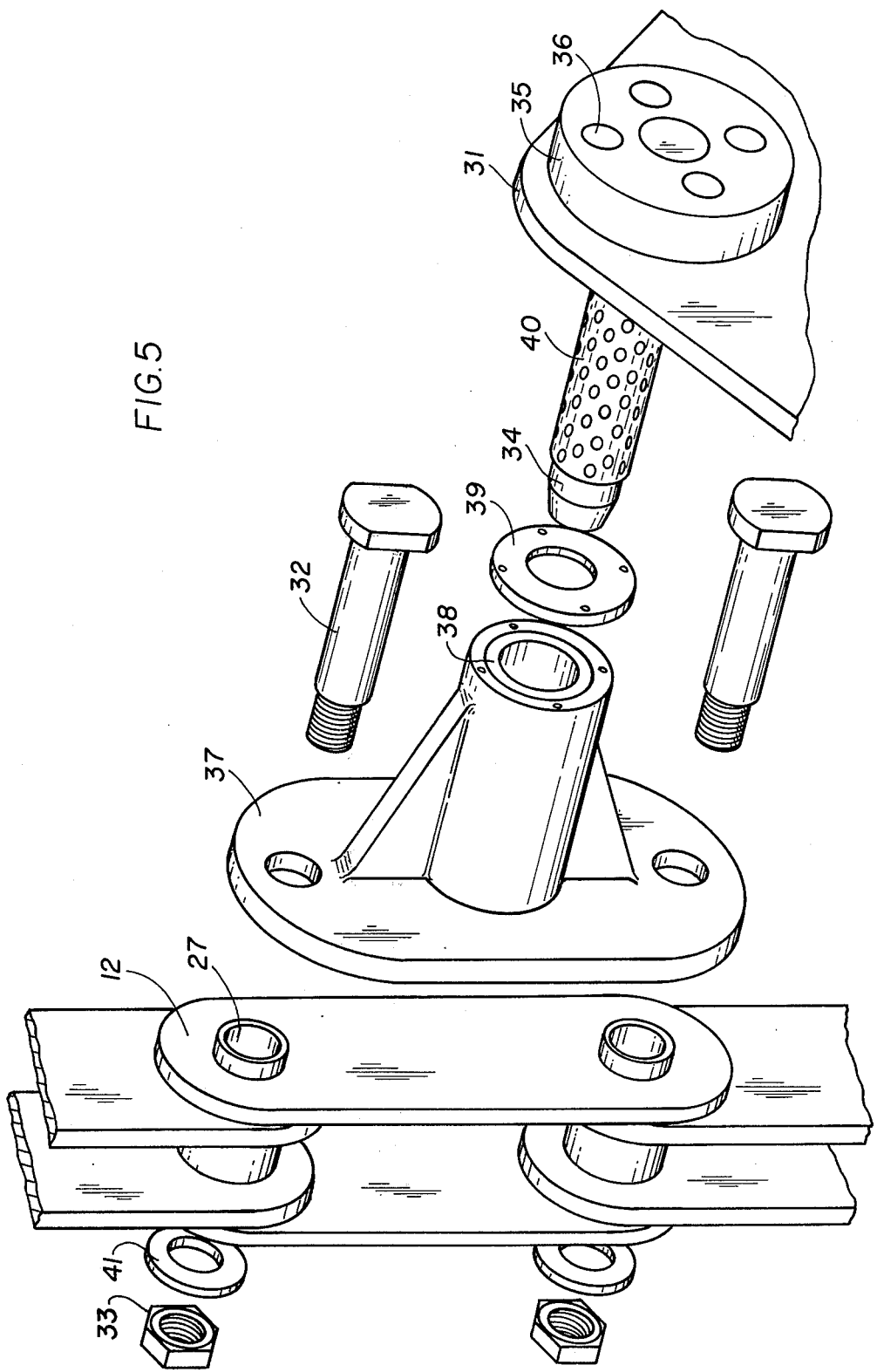
FIG. 5 is an exploded view similar to that of FIG. 2, showing another embodiment of fastening means for the ends of the transverse article supporting members of FIG. 3.

Referring now to the drawing, and first to FIG. 1, the apparatus is shown to comprise a pair of uprights 17, 17, each upright including a pair of elongated guide members 25, 25 defining respective vertical guide channels receiving the two vertically reciprocably moving courses $C_1$ and $C_2$ of the pair of endless link chains 12, 12. A pair of sprockets 16 and 26 are rotatably mounted on each upright 17 and the chain links are trained over the sprockets. The two ends of transverse bar 3 are fastened to the same course $C_1$ of each chain 12 for movement therewith in a manner to be described hereinafter with particular reference to FIG. 2.

The embodiment illustrated in FIG. 1 is particularly suitable for the storing and display of garments and the swinging transverse article supporting members of this embodiment are constituted by bar 3. The illustrated means for supporting garments on the transverse bar includes tubular support rods 2 whose ends are mounted on transverse bar 3 by means of brackets 5. The garments are supported on hangers 1 removably mounted on the support rods, each support rod being readily displaceable on and removably from bar 3.

The fastening means for the bar ends illustrated in FIG. 2 includes support bracket 7 for each transverse bar end, the bracket having forked part 7a with a pair of lugs 7a' defining a slot therebetween. Each transverse bar end consists of an axle or stub shaft 6 defining annular groove 6' having the same axial width as lugs 7a'. The bar end is supported on bracket 7 by inserting groove 6' in the slot between lugs 7a', thus immobilizing the bar against transverse movement in respect of the brackets. The lugs define a pair of transversely aligned holes 7a'', 7a'' for removably receiving cotter pin 8 for holding the bar ends in the brackets. The outer race 10 of a ball bearing is friction-fitted or otherwise fixed in bush 7b in the upper portion of bracket 7 and axle 9 is freely rotatably received in the inner race of the ball bearing and projects outwardly of the bracket through the bush so that the bracket is freely pivotal on the axle. Each link of chain 12 has a plurality of hollow pivot pins 27, one of the pivot pins pivotally interconnecting two adjacent chain links. The outwardly projecting end of axle 9 is freely rotatably received in a selected one of the hollow pivot pins for free pivoting of the axle in respect of the selected pivot pin, for instance one of the pivot pins interconnecting two adjacent chain links. Washer 11 is interposed in engagement with the inner ball bearing race to immobilize the same against transverse movement and washer 14 is interposed between the chain link and nut 13 threadedly engaging the threaded outer end of axle 9 to keep the bracket assembled on the chain. Flattened handle 15 at the other end of axle 9 may be turned for assembling and disassembling the fastening means.

This fastening means for the ends of transverse bar 3 enables the same swing or pivot freely to remain in its horizontal position during the passage of the endless chain drive about its sprockets, since the fastening suspends the bar in pendulum fashion.

As shown, upper sprockets 16, 16 are each mounted on a respective shaft 16' fixed to a respective one of uprights 17, a suitable anti-friction bearing supporting the upper sprockets on their shafts for independent rotation and the shafts being in horizontal alignment. The upper sprockets define a space therebetween to permit the garments supported on freely pivotal transverse bar 3 to pass through the space as the bar swings therethrough when the chain courses are reversed from their upward to their downward movement.

Similarly horizontally aligned lower sprockets 26, 26 are interconnected by transverse axle 4 having cheek plates engaging the sprockets. The sprockets are mounted in bearings on the uprights for rotation in unison. Sprockets 26 are power-driven, for instance by an electric motor (not shown) mounted on one of uprights 17. By way of example, the output shaft of the motor may be connected by a V-belt or sprocket-and-chain transmission to the drive shaft of unitized sprockets 26.

The two uprights are braced by a pair of crossbeams 18, 18 interconnected by diagonally extending tension cables to form a rigid support frame and each upright comprises two guide members 25 defining channels wherein the courses of chains 12, 12 run and are thus guided and protected. One of the uprights is shown to be embraced on three sides by casing 28 while the other upright, whereon the motor and transmission are mounted, is shielded by a sheet metal casing 29 surrounding the motor and transmission. The casing carries electric outlet 20 for connecting the motor to a source of electric power, and a control box 21 with an UP, DOWN and STOP button for controlling the movement of transverse bar 3 on which the garments are stored and displayed. Obviously any desired number of such bars may be mounted on endless chains 12, 12. A file 22 of tickets permits the garments stored on the apparatus to be inventoried.

A lever 24 is also mounted on casing 29 to enable the motor to be disconnected from the transmission whereby the sprockets 26, 26 may be driven manually by turning handwheel 23 coupled to the transmission and mounted on casing 29.

Plywood plate 19 is mounted on each end of transverse bar 3 so as to shield the chains and prevent rubbing of the garments against the chains or their being caught therein.

The apparatus illustrated in FIG. 3 is a modified version of the embodiment of FIG. 1 to enable the apparatus to store and display articles other than garments. To avoid redundancy in the description, all parts structurally and functionally equivalent to those in the apparatus of FIG. 1 have been designed by the same reference numerals in FIG. 3.

In the embodiment of FIG. 3, the transverse article supporting members are shown to take various forms adapted to respective types of articles to be stored and displayed. In all forms illustrated in FIG. 3, these transverse members are shown to comprise a pair of like elongated elements, such as metal rods or tubes, 30 defining a horizontal support plane and having their ends affixed, for instance by welding or soldering, to a pair of sheet metal plates 31. Unitized tubes 30 and plates 31 constitute transverse members for storing and displaying selected articles for sale.

Specific means for fastening these transverse members for free pivotal or pendulum movement on one course of link chains 12, 12 is illustrated in FIG. 5. This fastening means comprises stub shaft 34 affixed, for instance by welding, to head 35. The stub shaft is journaled in a hole in cheek plate 31 and is detachably affixed to the plate by any suitable fastening means, four screws 36 being shown to mount the stub shaft on the cheek plate so that the plate will move with the shaft. The stub shaft is received in bearing sleeve or bush 38 projecting from a support bracket constituted by mounting plate 37. The bush forms the outer race of an anti-friction, i.e. ball, bearing whose inner race 40 is mounted on stub shaft 34 and carries balls to permit the stub shaft to rotate freely within the bush when the stub shaft is inserted into the bush, with interposed washer 39. In this manner, the article supporting assembly comprising the pairs of tubes 30, cheek plates 31 and stub shafts 34 will be supported for free pivotal or pendulum movement about an axis parallel to the supporting plate of the assembly. The mounting plate has a pair of holes to receive bolts 32 and these bolts pass through hollow pivot pins 27 which pivotally interconnect two adjacent chain links in a manner described hereinabove in connection with FIG. 2. The bolts are held in positon by nuts 33, washers 41 being interposed between the nuts and the adjacent chain link. In this manner, mounting plate 37 is affixed to the link chain for vertical movement therewith.

As shown in FIG. 3, the particular structure of the transverse article supporting member will depend entirely on the type of article to be carried thereby. In member V, the assembly consists simply of the two tubes 30 subdivided into compartments by yokes 42 spaced along the tubes. Each yoke comprises two legs extending through holes in tubes 30, as more clearly shown in FIG. 4. While the tubes have been shown of circular cross section, they may, of course, have a rectangular, square or other suitable cross section. In the modified article support assembly W, boxes 43 are placed on the tubes between the yoked to provide support for relatively small articles. The support assembly X includes a carrier plate 44 mounted on square tubes and dividers 45 forming compartments. Assembly Y is a modification of assembly W, the yokes being farther spaced apart and the boxes therebetween being themselves sub-divided into compartments. Finally, assembly Z is useful for the support of tires, a carrier plate being mounted on square tubes to enable the tires to be stacked side-by-side on the carrier plate and held in position by the square tubes extending along the edges of the carrier plate.

What is claimed is:

1. An apparatus for storing and displaying articles comprising:
    1. a pair of uprights;
    2. a pair of endless movable link chains on said uprights respectively, each chain having two vertically extending courses of chain links sequentially connected by pivot pins;
    3. moving means for moving respective corresponding course of said link chains in unison, respective pivot pins of said corresponding courses being hollow;
    4. an axle received in each of said hollow pivot pins, each axle in the hollow pivot pins of one course defining a common axis with an axle in the corresponding other course;
5. a bracket mounted on each of said axles for angular movement about said common axis, each bracket having a forked part downwardly spaced from said common axis and defining a slot open axially in an upward direction;
6. an elongated bar member associated with each pair of said axles having a common axis and with the brackets mounted on said axles, the two longitudinal end portions of each bar member being each formed with an annular groove engaged by the forked part of one of the associated brackets in said slot, said grooves and said forked parts being dimensioned to prevent axial displacement of said end portions in said slots relative to the associated brackets; and
7. a cotter pin releasably received in each forked part and closing the slot of said forked part in an upward direction, whereby upward displacement of the bar member out of said slot is prevented.

* * * * *